Figure 6:
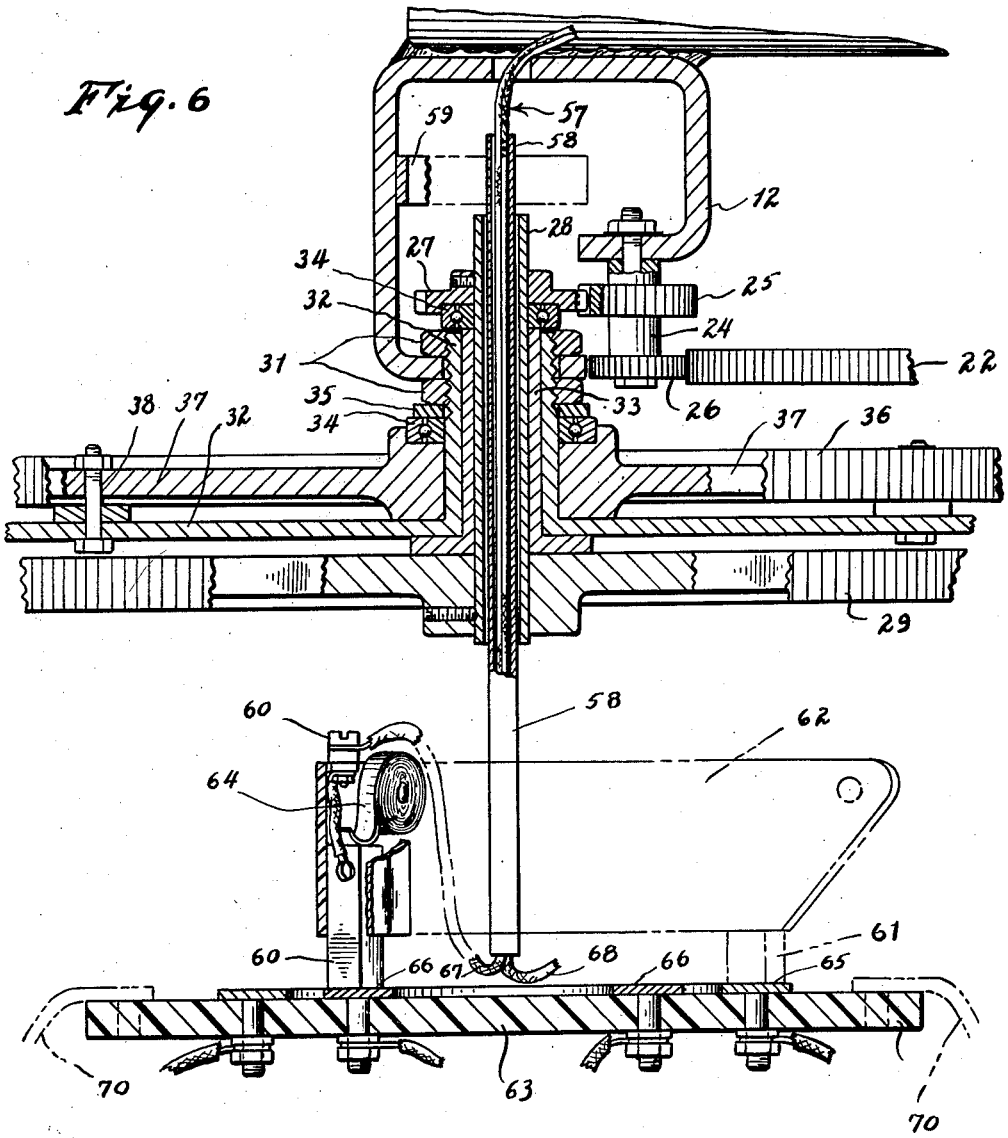

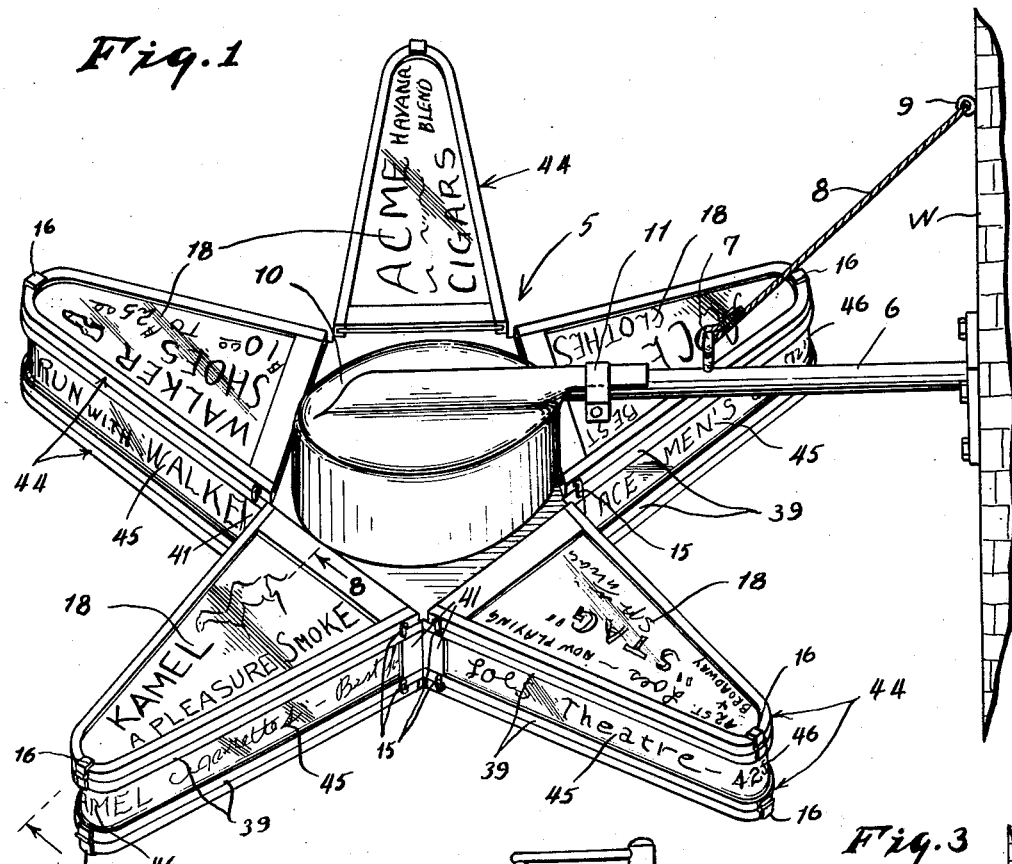
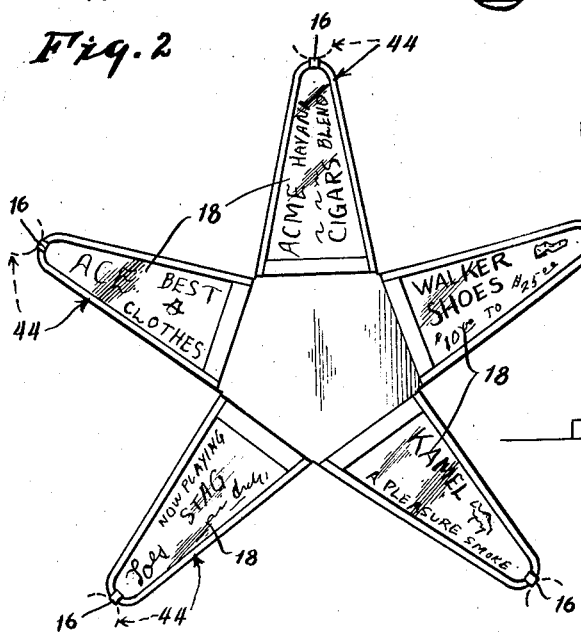
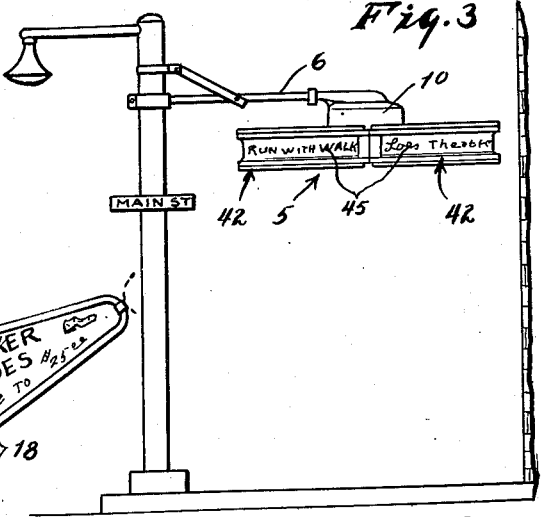

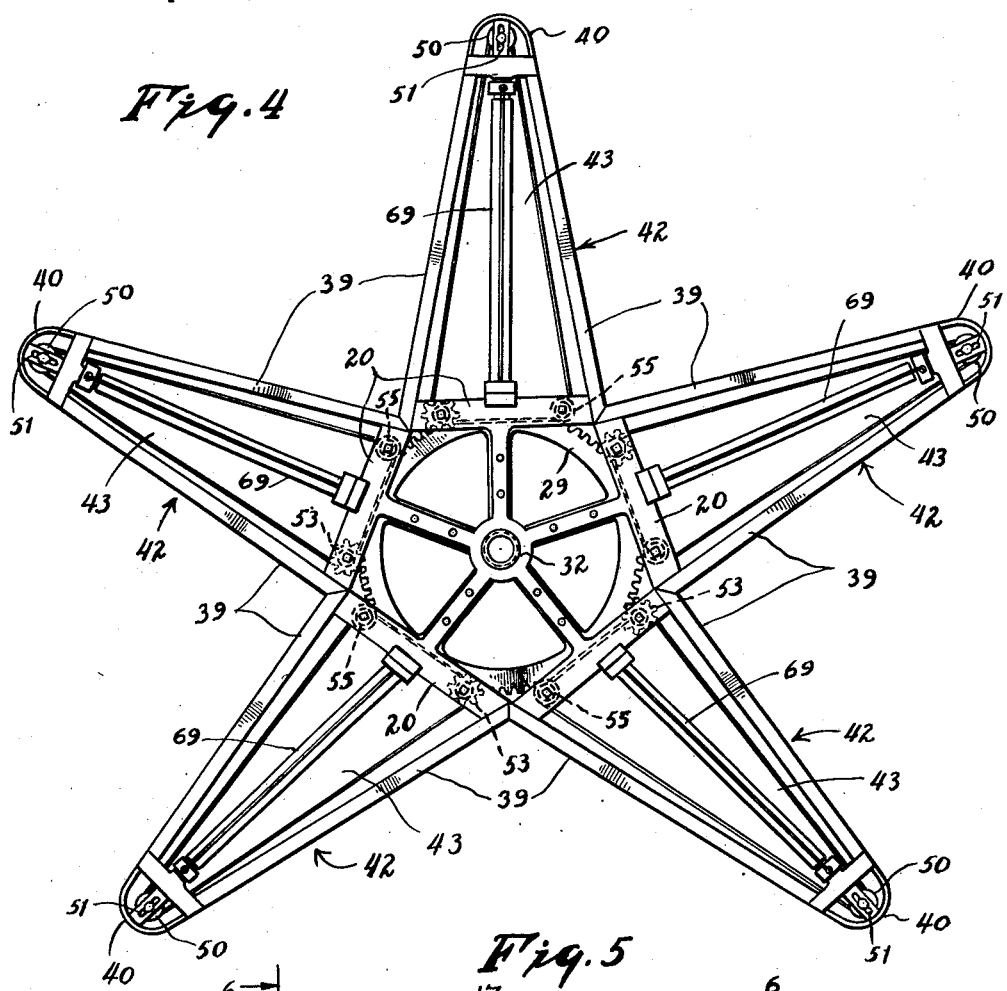
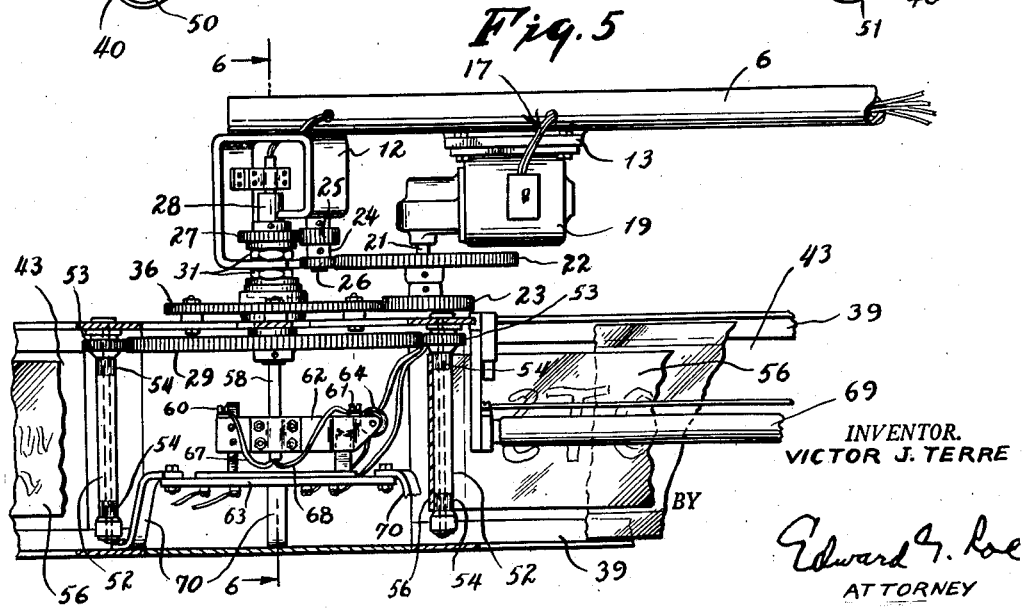

Oct. 22, 1957　　　V. J. TERRE　　　2,810,222
ROTARY DISPLAY DEVICES
Filed Sept. 12, 1955　　　4 Sheets-Sheet 3

INVENTOR.
VICTOR J. TERRE
BY
Edward G. Roe
ATTORNEY

Oct. 22, 1957 V. J. TERRE 2,810,222
ROTARY DISPLAY DEVICES
Filed Sept. 12, 1955 4 Sheets-Sheet 4
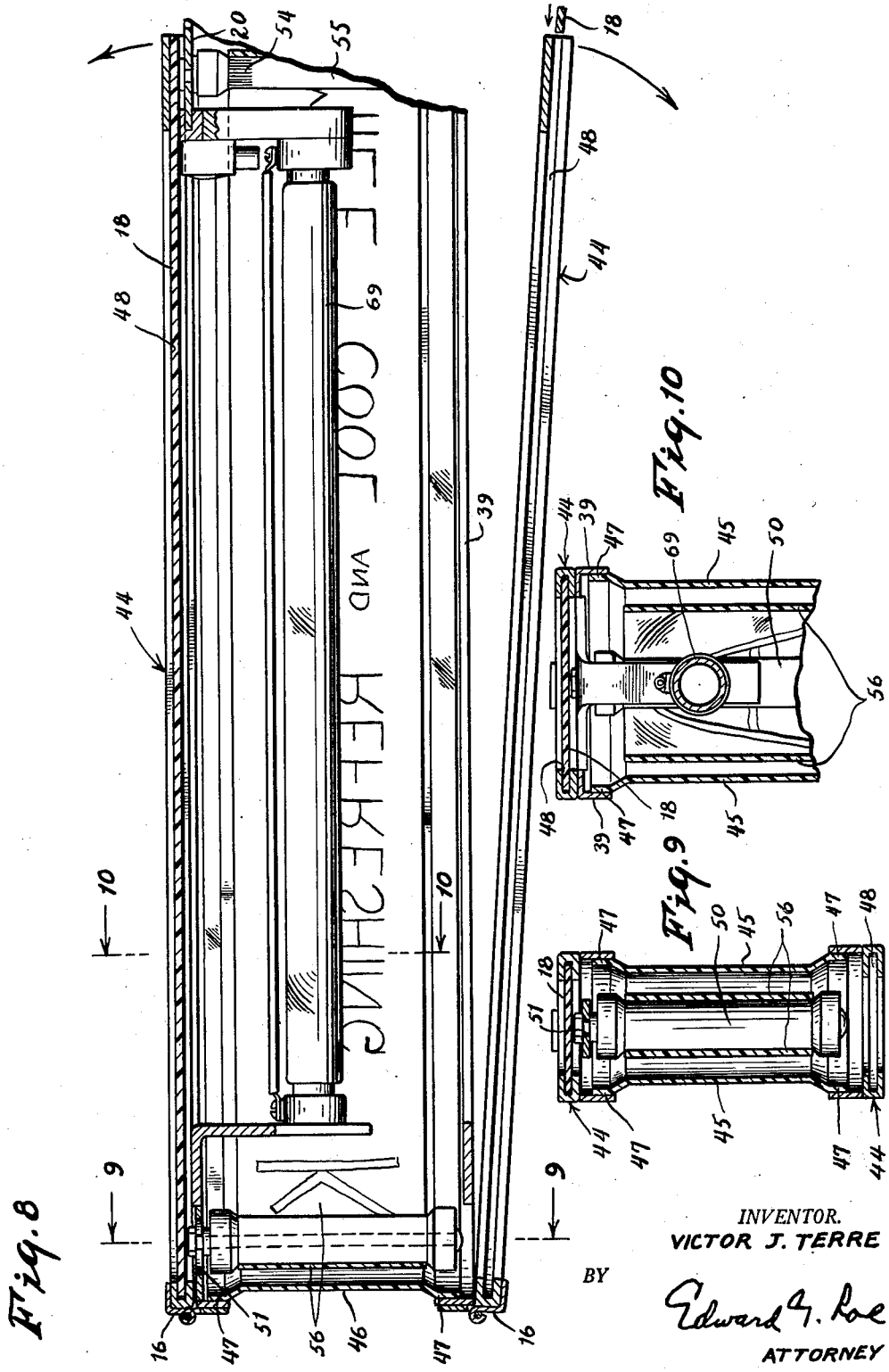
INVENTOR.
VICTOR J. TERRE
BY
Edward G. Roe
ATTORNEY

United States Patent Office

2,810,222
Patented Oct. 22, 1957

2,810,222

ROTARY DISPLAY DEVICES

Victor J. Terre, Brooklyn, N. Y.

Application September 12, 1955, Serial No. 533,757

6 Claims. (Cl. 40—32)

In a broad sense, the invention relates to display devices.

The improvements disclosed in the present patent application encompass an advanced suspension or supporting means for a rotary display device, enabling the maximum area for visibility and viewing of the advertising therein.

They also comprehend improvements in the means for changing the advertising or display to be viewed in each chamber of the device as well as achieving the maximum in area and kind of advertising and/or display which can be used in one device.

It is another purpose of the device to provide a star-shaped rotatable display device with transparent side walls upon each side and end of the protruding fingers of the machine, and with top and bottom frame doors for interchangeable advertising panels, capable of displaying not only advertising messages but selected scenes of the cinema, play, musical, opera, sporting event or the like.

Each separate finger of the star-shaped rotating display machine represents a distinctive advertising combination or unit of its own, wherein an advertisement is displayed and viewed from all sides, i. e., top and bottom with interchangeable panels and from the side walls with advertising endless belts; the advertising endless belts rotate at a faster speed than the star-shaped housing to facilitate clear visibility from any degree of observation all of the advertising messages and panels; hence, the fine points of a product or products are elucidated. Then, too, the various phases of a product from its beginning to its ultimate finished form may be shown with facility by the rotary display machine.

Another outstanding feature of the rotary display machine is the attractive and effective use of interchangeable third dimensional advertising belts and third dimensional advertising panels.

The rotary display machine is unique in delivering positive identification of advertisements consisting of interchangeable advertising panels in conjunction with endless advertising belt messages and pictures, or the like, with an unparalleled degree of continuous repetition and mobility.

Still another object envisions mounting the machine or device from ceilings, walls, or the like, to employ the star-shaped head or housing of the inventive concept.

These and other objects will be manifest after a perusal of the specifications and drawings.

It is to be understood at the outset that where I refer to the "advertising" in the specification, it is intended to encompass all manner of display or message, as for example, news clips, urgent messages from a municipality to its people inhabitants, weather prophecies, public service messages—in fact anything susceptible to public viewing.

Figure 7:
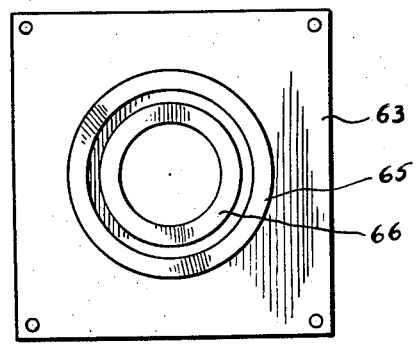

In the drawings:

Figure 1 is a perspective view of the invention;
Fig. 2 is a bottom plan view thereof;
Fig. 3 is a side plan view of the invention in an alternate mount;
Fig. 4 is a top plan view with doors removed;
Fig. 5 is a partial sectional view of driving, operating mechanism;
Fig. 6 is a sectional view of operating mechanism through line 6—6 of Fig. 5;
Fig. 7 is a top plan view of an insulated plate bearing positive and negative rings;
Fig. 8 is a sectional view taken through line 8—8 of Fig. 1;
Fig. 9 is a sectional view taken through line 9—9 in Fig. 8; and
Fig. 10 is a partial sectional view taken through line 10—10 of Fig. 8.

For purpose of clarity, at the outset I have marshalled below the numbered parts of the invention:

5—the complete display device
6—suspension arm
7—eye bolt mounted in arm
8—cable
9—eye bolt recessed in building wall
10—cover for operating mechanism
11—clamp to secure cover to arm 6
12—bracket suspended from arm 6
13—motor mount
15—latches
16—hinges
17—wires leading to motor
18—removable panel
19—motor
20—cross-bracing
21—vertical shaft of motor
22—upper gear on said shaft
23—smaller gear on same shaft
24—vertical shaft on bracket 12
25—upper gear on shaft 24
26—lower gear on shaft 24
27—gear driven by gear 25
28—tube
29—gear
31—nut
32—frame
33—bushing
34—bearings
35—spacer or washer
36—follower gear
37—web of gear
38—bolts
39—L-iron framework of rotary display device
40—apexes of iron framework
41—L-iron stops
42—legs
43—chambers
44—doors
45—sides of plastic or transparent strips
46—rounded outer end
47—shoulders
48—slots of frame doors
50—spools
51—slots
52—spool
53—gear
54—serrated portion
55—another spool
56—endless belts
57—wiring for lighting
58—stationary tube
59—clamp
60—brush
61—brush 62—fibre plate
63—another plate
64—spring
65—ring
66—ring
67—wire
68—wire
69—lighting source
70—arms The complete display device is denoted generally by the numeral 5 with 6 the suspension arm extending horizontally from a building wall, theater marque, or the like, bearing the reference W in Fig. 1.

Suspension arm 6 carries eye bolt 7 with cable 8 affording additional support for the device, anchored to eye bolt 9 recessed in building wall W.

Cover 10, as best shown in Fig. 1, is bracketed to arm 6 as at 11 while within cover 10 and also suspended from arm 6 is bracket 12. Numeral 13 denotes the motor mount with the wires leading to the motor and carried within arm 6 referred by the numeral 17. Motor 19 is mounted beneath arm 6 as at 13 and drives vertical shaft 21, carrying large upper gear 22 and relatively smaller gear 23, both suitably pinned to the shaft. Motor 19 is provided with the usual means (not shown) for starting and stopping the motor.

Cooperating with and geared to the motor is vertical shaft 24 suitably journalled in bracket 12, which carries upper and lower gears 25 and 26, linked together.

Meshing with gear 25 is another gear 27 which is pinned to tube 28 as is oppositely disposed gear 29 similarly pinned to the bottom portion of tube 28.

On the opposite sides of the lower flange of bracket 12 are a pair of nuts 31 threaded to the upstanding cylindrical portion of frame 32 with bushing 33 permitting free rotation of frame 32 about tube 28 at a different R. P. M. than that of said tube. And as part of the mechanism I also provide a pair of bearings 34 beneath respectively gear 27 and spacer or washer 35 beneath the lowermost nut 31.

As recited hereinbefore, lower positioned gear 23, as best shown in Fig. 5, is pinned to and driven by motor shaft 21 and geared to follower gear 36, the web 37 of which is bolted as at 38 to frame 32 of display device 5.

In top outline my display device assumes the shape of a five-pointed star, with each chamber of the device having an L-iron framework 39 top and bottom with rounded apexes 40 and vertical L-iron stops 41 at the juncture of each leg 42 and cross-braced at 20. For purpose of explanation, number 43 denotes the chambers, each of which, to facilitate access thereto, have both top and bottom hinged slotted frame doors 44, and each chamber of which includes a continuous strip of transparent plastic or equivalent material having, from a top view, converging sloping sides 45 and rounded outer end 46. At their upper and lower marginal portions sides 45 are provided with shoulders 47 equi-distantly spaced from sides 45.

Reverting to the hinged slotted frame doors 44, each of these are suitably hinged to the rotary display device 5 at their outer ends as at 16, and latched at 15.

Each frame door 44 is internally slotted at 48 and includes removable panel 18 to permit the ready removal and changing of advertising or display as desired.

Mounted in the top of the outer portion of chambers 43 are bevelled spools 50, which are adjustably movable in slots 51.

Oppositely disposed to spools 50 and having the top of its shaft journalled in cross-bracing 20, in each chamber 43, I have spool 52 carrying gear 53 driven by gear 29 and having upper and lower knurled or serrated portions 54. In adjacent relation to spool 52 there is another follower spool 55 journalled in cross-bracing 20 so that when motor 19 is energized, through the gear train and linkage comprising gears 22, 26, 25, 27, tube 28, gear 29 and the four driven gears 53, four endless belts 56 carrying a multiplicity of signs and/or advertising messages are caused to be moved around spools 50, 52, 55 to show a variety of messages through the transparent sides 45 of the chambers.

Adverting to the wiring for the lighting circuit for my display device, 57 designates the wiring therefor which runs through stationary tube 58 mounted within bracket 12 as by clamp 59 and are suitably connected to a pair of brushes 60, 61, mounted on fibre plate 62 clamped to tube 58 which are kept in continuous contact with plate 63 by springs 64, said fibre plate having positive and negative rings 65, 66 contacting brushes 60, 61. With these brushes are connected pairs of wires 67, 68 which supply current to lighting source 69, which may be the fluorescent lights as shown in each chamber or any other source ample to illuminate the belts 56 traversing the chambers or the advertising and display shown in slots 48 of the doors 44.

As can be seen in Figs. 5 and 6, plate 63 is supported within the rotary display device by arms 70 and this plate, with rings 65, 66 is turned as the display device turns and the rings are maintained in constant contact with stationarily supported brushes 60, 61.

The rotary display device has manifold advantages; it will prove a prolific source of revenue to advertisers, those with presently unused space at which the device can be mounted as well as providing an entirely new media to supplant other methods and means of advertising and display. It provides the maximum degree of observation for the advertising and display as well as facile interchangeability of the advertising and display belts and the upper and lower panels. To change belts 56, it is merely necessary to loosen the bolt holding spool 50, move the spool inwardly in slot 51 and change belt 56 to one having a different display. Likewise, panels 18 are readily removable from doors 44 for the purpose of inserting another panel 18 with a different display.

I reserve the right to make such changes or modifications as may come within the scope of the appended claims.

I claim:

1. A rotary display device of the class described comprising a star-shaped housing having a plurality of chambers extending from a central portion, each chamber containing a source of light and having doors affording access thereto, a suspension arm carrying at its outer end a source of power positioned above and operatively connected to two gear trains in said central portion, endless belts arranged to travel around the interior sides of the chambers, said two gear trains driven by the source of power being characterized by one adapted to rotate the device and one for simultaneously and separately moving the belts.

2. A rotary display device of the class described comprising a housing having a plurality of chambers, each containing a source of light and having doors affording access thereto, a suspension arm carrying at its outer end a source of power positioned above and operatively connected to gears mounted in said central portion; transparent, vertically positioned sides on the outside of each chamber, endless belts arranged for travel around the inside of the chambers, and two gear trains driven by the source of power, one for rotating the display device at one R. P. M. and the other for moving the belts at a different R. P. M.

3. A rotary display device of the class described comprising a star-shaped housing including a top, a bottom, a plurality of fingers, each comprising a chamber and containing a source of light, each finger extending from a common central portion and vertical, transparent side walls around each of the fingers, the top and bottom of each finger having a hinged door with a longitudinal slot therein, changeable endless belts arranged for travel around the interior of the chambers, removable panels for insertion in the slots, a source of power mounted above the central portion of the housing, two gear trains driven by the source of power, one for rotating the housing at one R. P. M. and the other for separately and simultaneously moving the belts at a different R. P. M.

4. A rotary display device of the character described, comprising a star-shaped housing including a top and a bottom, and a space therebetween, a plurality of fingers extending from a central portion and each comprising a separate chamber, each having a light source, hinged, latched doors for each chamber top and bottom, a source of power positioned above the housing, changeable endless belts arranged for travel around the interior of the chambers, transparent, vertical side walls around the chambers and extending to the central portion, a source of power mounted above the central portion of the housing, two gear trains driven by the source of power, one for rotating the device at one R. P. M. and the other for rotating the belts at a different R. P. M.

5. A rotary display device of the character described, including a housing having a plurality of fingers extending from a common central portion and each comprising a separate chamber, hinged latched doors for each chamber top and bottom, longitudinal slots in each door, display panels for insertion in each slot for displaying advertising, and other material, endless belts arranged for movement in each chamber, means for suspending the device, a source of power positioned above and connected to the housing, and means to connect the source of power, the housing and the endless belts whereby to rotate the housing and the endless belts at different R. P. M.

6. A rotary display device of the character described, including a housing having a plurality of fingers extending from a common central portion and each finger comprising a separate chamber, access doors adapted to be opened and closed for the top and bottom of each chamber, endless belts arranged for movement in each chamber, an arm for suspending the device positioned above and connected to the housing, and means connecting a source of power, the housing and the endless belts whereby to rotate the housing and the endless belts at different R. P. M.

References Cited in the file of this patent
UNITED STATES PATENTS

| 858,452 | Harding | July 2, 1907 |

FOREIGN PATENTS

| 370,020 | Italy | Apr. 8, 1933 |